United States Patent [19]

Sengupta et al.

[11] Patent Number: 5,312,790
[45] Date of Patent: May 17, 1994

[54] CERAMIC FERROELECTRIC MATERIAL

[75] Inventors: Louise C. Sengupta, Woburn; Eric Ngo, Brighton; Steven Stowell, Jamaica Plain; Gary Gilde, Brighton; Robert Lancto, Wakefield, all of Mass.

[73] Assignee: The United States of America as represented by the Secretary of the Army, Washington, D.C.

[21] Appl. No.: 76,291

[22] Filed: Jun. 9, 1993

[51] Int. Cl.$^5$ .............................................. C04B 35/46
[52] U.S. Cl. ..................................... 501/137; 501/153
[58] Field of Search ................................ 501/137, 153

[56] References Cited

U.S. PATENT DOCUMENTS 4,987,107  1/1991  Narumi et al. ...................... 501/137

FOREIGN PATENT DOCUMENTS 0017062  5/1972  Japan ................................... 501/137
3004448  1/1983  Japan ................................... 501/137
4026101  1/1992  Japan ................................... 501/137
4026102  1/1992  Japan ................................... 501/137

Primary Examiner—Mark L. Bell
Assistant Examiner—Deborah Jones
Attorney, Agent, or Firm—Saul Elbaum; Freda L. Krosnick

[57] ABSTRACT

A novel ceramic ferroelectric material having a low dielectric constant, low loss and high tunability. The material is a composite comprising Barium Strontium Titanate (BSTO) and a ceramic material having a low dielectric constant. The preferred composite is represented by $Ba_{1-x}Sr_xTiO_3$-$Al_2O_3$, wherein x is greater than 0.00, but less than or equal to 0.70, and wherein the percent weight ratio between $Ba_{1-x}Sr_xTiO_3$ and $Al_2O_3$ ranges from approximately 99%–40% and 1%–60%, respectively. The novel materials possess superior electronic properties; and they may be employed in various antenna systems.

4 Claims, No Drawings

CERAMIC FERROELECTRIC MATERIAL

GOVERNMENTAL INTEREST

The invention described herein may be manufactured, used and licensed by or for the U.S. Government without payment to us of any royalty thereon.

BACKGROUND OF THE INVENTION

The need exists for the fabrication of ceramic materials having improved electronic properties which may be adjusted for a particular, intended use. The present invention deals with novel ceramic ferroelectric materials having ideal properties for use, for example, in phased array antenna systems.

Ferroelectric materials which are commonly used in the antenna arts are porous ceramics, whose properties are less than ideal for their intended application. Porous ceramics of the $Ba_{1-x}Sr_xTiO_3$ type are commonly employed in ceramic phase shifter antennas. However, these materials display certain deficiencies due to both the processing difficulties and expense, as well as their overall electronic and microwave properties. These deficiencies include electronic inhomogeneity, structural weakness, reproducibility and processing control, and large loss tangents.

Barium Strontium Titanate ($BaTiO_3$-$SrTiO_3$), also referred to herein as BSTO, has been known to be used for its high dielectric constant (approximately ranging from 200 to 6,000) in various antenna applications. This is set forth by Richard W. Babbitt et al. in their publication, "Planar Microwave Electro-Optic Phase Shifters," *Microwave Journal*, Volume 35(6), (June 1992). This publication concludes that there exists a need for additional research to be conducted in the materials art to yield materials having more desirable electronic properties.

Although the employ of BSTO in phase shifters is known, nowhere in the technical arena of ceramic art has there been any suggestion of modifying BSTO, or combining BSTO with additives, in the manner described herein. Moreover, the specific BSTO combinations, which have enhanced electronic properties, are deemed novel.

The present invention provides for improved materials which exhibit electronic properties which can be adjusted for use, for example, in any discrete element phase shifter design—i.e. planar microstrip, wave guide geometries or parallel plate structure. The invention herein is superior to other currently used ferroelectric materials in the art.

BRIEF DESCRIPTION OF THE INVENTION

The subject matter of the present invention relates to the fabrication of specific ceramic materials which have sought after properties in, for example, phased array antenna systems. The sought after properties include (1) a low dielectric constant; (2) a low loss; and (3) high tunability. Dielectric constant is related to the energy storage in the material; whereas, the loss tangent is related to the power dissipation in the same material. In general, the dielectric function is a complex quantity with $\epsilon = \epsilon' - i\epsilon''$; and the loss tangent, $\tan \delta = \epsilon''/\epsilon' = 0.01$ or less.

Tunability may be defined as ((dielectric constant with no applied voltage)−(dielectric constant with an applied voltage))/(dielectric constant with no applied voltage). For simplicity purposes, tunability can be represented as T $$T = \frac{(X - Y)}{X} \quad (1)$$

wherein,
X=(dielectric constant with no applied voltage); and
Y=(dielectric constant with an applied voltage).
The tunability of a material under an electric field of 7.0 KV/cm can range from 1-60% depending upon the composition of the materials employed.

The materials herein combine Barium Strontium Titanate ($BaTiO_3$-$SrTiO_3$) with Alumina ($Al_2O_3$). These materials, encompassed by the present invention, are superior in that they are homogeneous, easily machinable, and possess superior electronic properties at both dc and microwave operating frequencies. Moreover, the materials herein have low water absorptivity. Typically these materials will absorb less than 2% by weight of water therein. Hence, the materials within the scope of the present invention are environmentally stable—for example, they have good moisture and temperature stability.

Although other combinations of electrically active and inactive components have been commonly employed in conjunction with piezoelectric materials, nowhere has the combination of the present invention been described. More specifically, the present invention is the first teaching wherein BSTO is combined with Alumina in order to adjust the electronic properties of a material. Specifically, nowhere has BSTO been combined with Alumina to adjust the electronic properties of the material for use in a phase array antenna system. Aside from the combination of BSTO with Alumina being novel, its application in phase array antenna systems is an application never suggested in the prior art.

Replacing the currently employed materials with the novel ferroelectric composite described in the present invention will improve the overall performance of a phased array antenna system as well as reduce the cost, weight and size of the antenna per se.

Accordingly, it is an object of the present invention to provide a ferroelectric material suitable for, but not limited to, use in phased array antenna systems.

It is a further object of the present invention to fabricate a material exhibiting enhanced electronic properties.

It is still a further object of the present invention to provide a ferroelectric material having a low dielectric constant, a low loss and a high tunability.

It is a further object of the present invention to provide materials having electronic properties, wherein said electronic properties can be adjusted in such a manner that they can be employed in any discrete element phase shifter design.

It is a further object of the present invention to provide a ferroelectric material which is easily machinable.

Still, it is a further object herein to provide a ferroelectric material which possesses superior electronic properties at both dc and microwave operating frequencies.

The means to achieve these and other objectives of the present invention will be apparent from the following detailed description of the invention and claims.

DETAILED DESCRIPTION OF THE INVENTION

The present invention encompasses the fabrication of novel ceramic materials having enhanced electronic properties. These materials are superior to other currently employed ferroelectric materials.

When one considers the optimization in the electronic properties of ceramic materials, the following parameters must be taken into consideration:

(1) Dielectric Constant: Ideally the dielectric constant should be low, ranging from approximately 30 to 200. This dielectric constant range does not decrease the phase shifting ability of the material if a sufficient length of material is used (then a high dielectric constant is not needed). As insertion loss (loss of energy getting into the ceramic) does not depend upon the dielectric constant, it is not effected by lowering the dielectric constant. Also, since the loss tangent (tan $\delta$) increases with increasing dielectric constant (for these ferroelectric materials), lower dielectric constant materials tend to have lower loss tangents and therefore, less insertion loss.

(2) Low Loss: The loss tangent (intrinsic to the material) serves to dissipate or absorb the incident microwave energy and therefore is most effective in this device when the loss tangent is in the range of 0.01 or less. The low loss tangent serves to decrease the insertion loss and hence increase the phase shifter per decibel of loss.

(3) High Tunability: The tunability of a particular material effects the material's electronic properties by how much the dielectric constant changes with applied voltage. The amount of phase shifting ability is directly related to the tunability; therefore, higher tunabilities are desired. The tunability can be increased to some extent by decreasing the sample thickness. The insertion loss is inversely related to the tunability so that the larger the tunability, the smaller the insertion loss. Optimum electronic properties would have tunabilities ranging from 4 to 50% (depending upon other factors, dielectric constant and loss tangent).

The materials within the scope of the present invention fall within the optimum characteristics outlined above. These materials are $Ba_{1-x}Sr_xTiO_3$-$Al_2O_3$, wherein x is greater than 0.0 but less than or equal to 0.70. This formulation may be referred to as Barium Strontium Titanate and Alumina. The weight ratios of Barium Strontium Titanate (BSTO) to Alumina may range from 99% wt.–40% wt. BSTO to 1% wt.–60% wt. Alumina. A typical composition within the present invention may comprise 70% by weight BSTO (wherein x=0.35) and 30% by weight Alumina ($Al_2O_3$) This composition has a dielectric constant of 55.2, a loss tangent of 0.007 and a tunability of 8.0 (applied electric field=32.8 KV/cm).

Alumina is used herein to adjust the electronic properties of BSTO. Specifically, it effects the material's dielectric constant and dielectric loss to meet the requirements for various applications—for example, in the antenna arts. The electronic properties of the formulation herein can be adjusted for use in any discrete element phase shifter design, such as planar microstrip, wave guide geometries or for use in a parallel plate structure.

It has been found that the electronic properties of BSTO Alumina are reproducible to within 2%. Hence, once a specific formulation of BSTO Alumina is determined to be suitable for a specific purpose, the material can be accurately reproduced.

The preparation of BSTO Alumina may be accomplished by obtaining powders of Barium Titanate and Strontium Titanate. These powders are ball milled in a conventional manner in an organic solvent. This particular mixture is then air-dried and calcined at approximately 200 degrees below the sintering temperature for several hours. The resultant BSTO is then mixed with Alumina in the desired weight percentage and re-ball milled in an organic solvent with a binder. The final mixture is then air-dried, once again, and dry-pressed at approximately 7,000 p.s.i. The final samples are sintered in air.

Table 1 sets forth the various properties of BSTO Alumina, wherein the formulation is represented by $Ba_{0.65}Sr_{0.35}TiO_3$ - Alumina.

TABLE 1

| Alumina Content (wt. %) | Density (g/cc) | % Porosity | % Absorption |
|---|---|---|---|
| 1.00 | 5.314 | 4.24 | 0.55 |
| 5.00 | 5.046 | 4.16 | 0.64 |
| 10.0 | 4.820 | 7.93 | 1.30 |
| 30.0 | 4.018 | 8.19 | 1.58 |
| 60.0 | 3.458 | 7.65 | 1.73 |
| 80.0 | 3.496 | 4.54 | 1.00 |

The electronic properties of some of the formulations within the present invention are set forth in Tables 2 and 3. The representative formulations for which electronic properties are tabulated are for BSTO at Ba=0.65 and Ba=0.60 with varying Alumina content.

TABLE 2

| BSTO (Ba = 0.65) and Alumina | | | | |
|---|---|---|---|---|
| Alumina Content wt. % (KV/cm) | Dielectric Constant | Loss Tangent* | Tunability (Percent) | Electric Field |
| 1.0 | 4850 | 0.009 | 39.8 | 7.32 |
| 10.0 | 967 | 0.017 | 27.2 | 11.9 |
| 30.0 | 55.2 | 0.007 | 8.0 | 32.8 |
| 60.0 | 18.8 | 0.002 | 2.7 | 32.0 |

TABLE 3

| BSTO (Ba = 0.60) and Alumina | | | | |
|---|---|---|---|---|
| Alumina Content wt. % (KV/cm) | Dielectric Constant | Loss Tangent* | Tunability (Percent) | Electric Field |
| 5.0 | 1751 | 0.014 | 55.3 | 25.1 |
| 10.0 | 860 | 0.011 | 34.6 | 15.4 |
| 20.0 | 201 | 0.017 | 19.8 | 24.6 |
| 22.0 | 135 | 0.015 | 14.4 | 27.2 |
| 30.0 | 49.7 | 0.010 | 5.13 | 22.1 |

*Note: The magnitude of the loss tangents reported approach the limit of measurement capability of the test apparatus; therefore, actual loss tangents are in some cases less than these values.

If the antenna application does not require exceedingly high tunability (where tunability can be increased with a decrease in sample thickness for a given externally applied electric field), then the compositions with lower dielectric constants are probably likely to produce less impedance mismatch and may possess lower loss tangents.

EXAMPLE 1

Powder forms of Barium Titanate and Strontium Titanate were obtained from Ferro Corp., Transelco Division, Pen Yan, N.Y. (product nos. 219-6 and 218, respectively). The powders were stoichiometrically mixed in a slurry of ethanol and ball-milled using alumina 3/16" grinding media. This was performed for 24 hours. The mixture was subsequently air dried and calcined for 5 hours at approximately 1100° C. The resulting BSTO was mixed with powder Alumina (ALCOA Industrial Chemicals, Bauxite AR, distributed by Whittaker, Clark, and Daniels, South Plainfield, N.J., product no. A16-SG) in the proper weight percent. This mixture was then re-ball milled in a slurry of ethanol using a 3/16" alumina grinding media for an additional 24 hours.

To the resulting BSTO/Alumina mixture, Rhoplex B-60A (Rohm and Haas Co., Philadelphia, Pa.), which is a 3% wt. organic binder consisting of an aqueous emulsion of acrylic polymer, was added to improve green body strength and to permit sample fabrication in greater dimensions. (Green body strength refers to the ability of unfired material to remain intact and to withstand handling; it also implies better densities in the unfired pieces.) Other binders and plasticizers may be added at this point to allow extrusion molding or for fabrication of tape-cast sheets of material.

The mixture is then air-dried and dry-pressed to a pressure of approximately 7,000 p.s.i. Sintering schedules are ascertained by employing a deflectometer such as a Mitutoyo digimatic indicator and miniprocessor (Mitutoyo Corp., Paramus, N.J.). The final samples were fired in various furnaces and the densities of the samples were found to be reproducible to within 1 to 2%.

The properties of the resulting BSTO - Alumina samples are set forth in Table 1, above.

While particular embodiments of the present invention have been shown and described, it will be obvious to those skilled in the art that changes and modifications may be made without departing from this invention. For example, the invention may be modified to include ceramic-ceramic composites of BSTO and other low dielectric constant materials depending upon the particular requirements of the intended application. Among some of the other low dielectric constant materials which may be combined with BSTO are zirconia, magnesia, alumina microballoons, alumina fibers or fabric, silicon dioxide and other low dielectric constant, low dielectric loss oxides. (Alumina microballoons are hollow spheres of approximately 1-5 microns in diameter and are already sintered components (BSTO/ceramic)—the electronic properties of a composite employing alumina microballoons will most likely differ from composites employing alumina powder. Alumina fibers or fabric, when employed in the composite within the scope of the present invention, may possess electronic properties different from composites which employ alumina powder. This is due to the fact that this form of alumina is most likely to be in sintered form; and the fibers or fabric alumina produce different connectivity between the BSTO particles.)

It is, therefore, intended that the claims herein are to include all such obvious changes and modifications as fall within the true spirit and scope of this invention.

I claim:

1. A ceramic ferroelectric composite material consisting essentially of

Barium Strontium Titanate, said Barium Strontium Titanate represented as $Ba_{1-x}Sr_xTiO_3$, wherein x is greater than 0.0 but less than or equal to 0.70; and
   alumina; wherein said Barium Strontium Titanate and alumina are present in amounts to provide a composite having a low dielectric constant, low loss tangent and high tunability.

2. The ceramic ferroelectric composite material of claim 1, wherein said Barium Strontium Titanate is $Ba_{1-x}Sr_xTiO_3$, wherein $x = 0.35$ to $0.40$.

3. The ceramic ferroelectric composite material of claim 2, wherein the weight ratio of said Barium Strontium Titanate to alumina ranges from approximately 99%-40% Barium Strontium Titanate to approximately 1%-60% alumina.

4. The ceramic ferroelectric composite material of claim 3, wherein the ratio of Barium Strontium Titanate to alumina is approximately 70% wt. Barium Strontium Titanate to approximately 30% wt. alumina.

* * * * *